Figure 1:
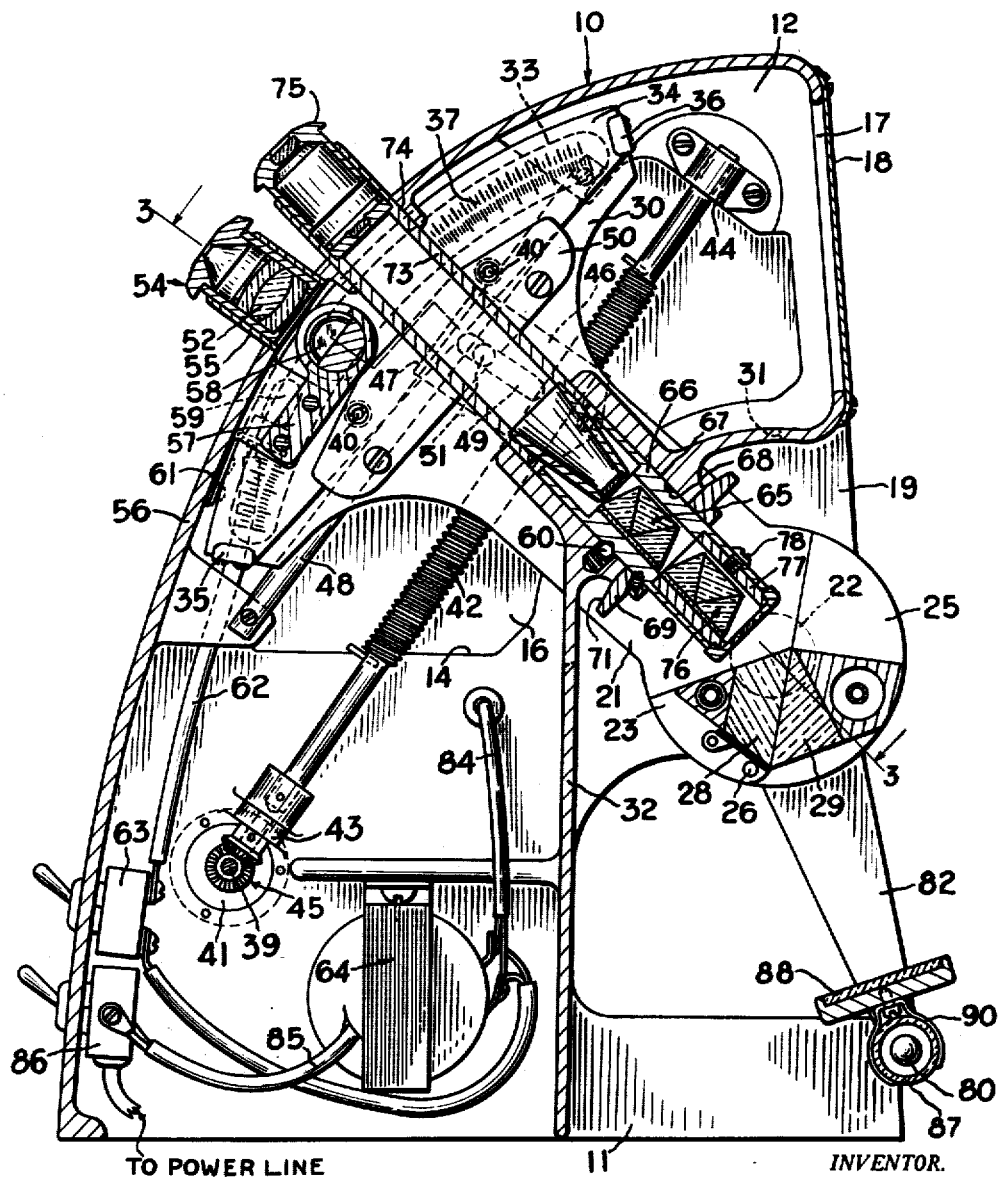

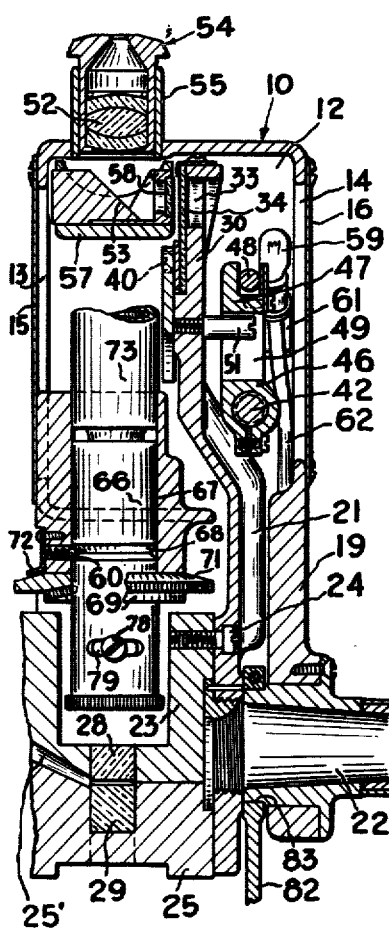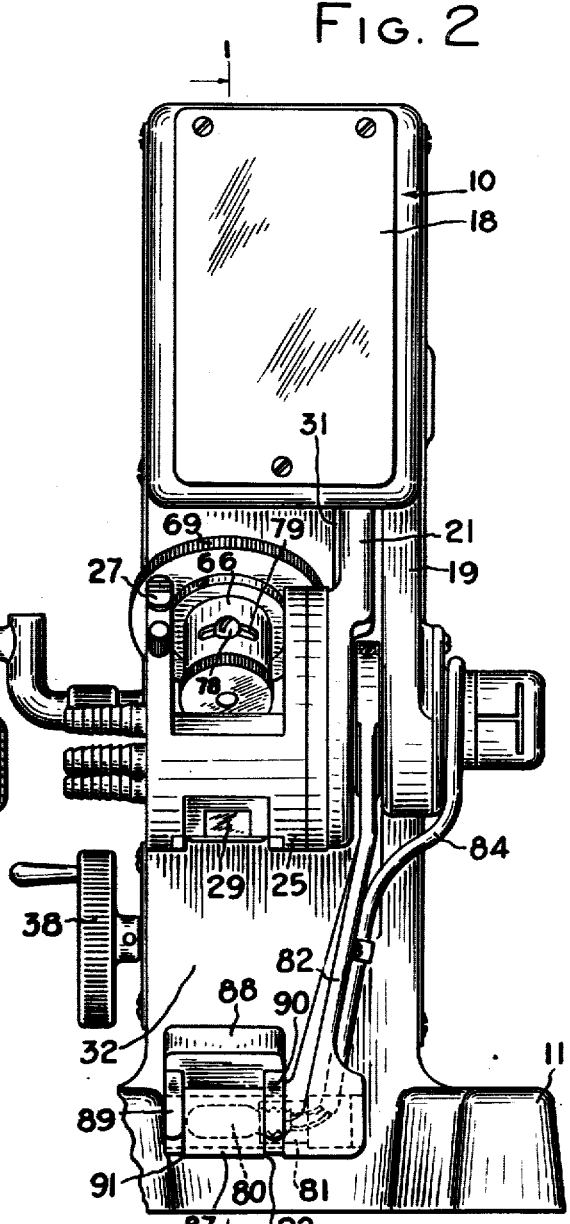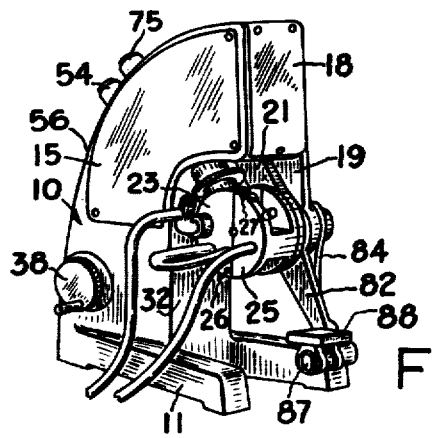

Patented Nov. 13, 1951

2,574,734

UNITED STATES PATENT OFFICE 2,574,734

ABBÉ TYPE REFRACTOMETER

John W. Forrest, Brighton, and Raymond F. E. Stegeman, Greece, N. Y., assignors to Bausch & Lomb Optical Company, Rochester, N. Y., a corporation of New York Application July 20, 1949, Serial No. 105,682

3 Claims. (Cl. 88—14)

This invention relates to refractometers of the Abbe type and more particularly it relates to improvements in the operating mechanism, achromatizing means and the general housing structure of the instrument.

Due to the increasing use of refractometers as production testing instruments in diverse and exacting fields of use, need has arisen for a refractometer which is rugged enough in construction to withstand careless handling in production operations while still being capable of continuous precision performance over long periods of use.

Because refractometers are used to test a wide variety of substances, such as food products, oil, etc., these instruments become damaged as a result of the adherence of such substances to the working parts thereof. It is, therefore, important that these instruments are so designed that the working parts are protected from the injurious effects of such deposits without interfering with accurate and expeditious use of the instrument.

One of the essential elements used in obtaining precision performance from the Abbe type refractometer is the compensating prism by means of which the dividing line of total reflection in the field of view is achromatized when using white light. These prisms are of the Amici type and in manufacturing such prisms, it is important that the dispersion of every prism be held very closely to a specified amount so that the dispersion of these prisms will agree with a standard dispersion scale used in different refractometers and will, therefore, be interchangeable. The great amount of highly skilled work required to form accurately each of the nine angles between the refracting surfaces and carefully cement the three elements of each Amici prism together with a perfectly even layer of cement results in high costs for the instrument. Furthermore, variations in the index of refraction of the optical material from which such prisms are made, as well as slight misalignments of the contiguous elements of the prism increases the difficulty of close control of dispersion. The present practice of reforming the exit surface of the Amici prism at a revised angle so as to correct for all the accumulated errors is not effective for high precision instruments since the dispersion in some parts of the spectrum is thereby rendered imperfect. To obtain an accurate specified maximum value of said dispersion, it is here proposed to provide a second Amici prism for adjusting the maximum dispersion of the optical system so that a specified amount of dispersion may be exactly obtained without recourse to expensive manufacturing methods.

It is, therefore, an object of this invention to provide an improved refractometer having means for adjusting the maximum dispersion of the Frauenhaufer C—F lines of the visible spectrum accurately to a predetermined value.

It is another object to provide such a device in which its operating parts are protected from the injurious effects of the substances which are being tested or from mechanical damage.

It is also an object of this invention to provide an improved refractometer which is rugged and dependable and easy to operate under production conditions.

Further objects an advantages will be apparent in the details of construction and combination of parts by reference to the following description and accompanying drawings in which:

Fig. 1 is a sectional view taken substantially on the line 1—1 of Fig. 2 showing a refractometer embodying a preferred form of our invention, Fig. 2 is a rear view of the refractometer, with parts broken away, Fig. 3 is a sectional view of the instrument taken on the line 3—3 of Fig. 1, and Fig. 4 is a perspective view of the refractometer on a reduced scale.

As shown in the drawings, the refractometer comprises an upright housing 10 extending upwardly from a broad base portion 11 and having an interior chamber 12 which is open at the bottom and extends substantially to the top of the housing. Large openings 13 and 14 are provided on opposite sides of the housing 10 to permit easy access to the mechanism in chamber 12. Cover plates 15 and 16 are fixed respectively by any suitable means such as screws over the openings 13 and 14. Likewise, another opening 17 is provided in the rear part of housing 10 and a cover plate 18 is suitably fixed thereover which together with plates 15 and 16 totally enclose important working parts of the instrument as will be apparent hereinafter.

From the rear side of the housing 10 projects a flange 19 on which a movable arm 21 is pivoted by means of a spindle 22 which is fixed to said arm and is journaled in said flange. On the inner side of arm 21 there is fixed a substantially cylindrical prism box comprising a semi-cylindrical part 23 held in any preferred manner such as the screws 24 to the arm. A complementary semi-cylindrical part 25 is hinged at 26 to the stationary part 23. In order to hold the two parts 23 and 25 together, a hooked spring clip 27 is mounted on part 23 so as to engage in a suitable notch on part 25. A pair of specimen holding prisms 28 and 29 are contiguously mounted respectively in parts 23 and 25 of the prism box, and the interfaces of these prisms are slightly spaced apart to provide a narrow chamber for receiving a fluid specimen to be tested. Part 25 of the prisms box swings open about the hinge pin 26 to permit placing the fluid specimen directly on the contiguous interfaces between said specimen holding prisms 28 and 29.

The free end of arm 21 extends into chamber 12 through an elongated clearance slot 31 formed in the concavely shaped portion of rear wall 32 of the housing 10, and said free end is broadened fanwise in a direction parallel to the cover plates 15 and 16 to form a scale sector 30. In the sector 30 of the arm and along its outer arcuate edge, is an arcuate opening 33 located at a constant radius about the axis of spindle 22. Overlying opening 33 on one side of the sector 30, is a transparent glass scale plate 34 which is retained against the arm by a pair of holding clips 35 and 36 and a pair of set screws 40 threaded in a retainer plate 50 which together provide means for attaching the scale plate to the sector. On plate 34, an arcuate sector scale 37 is suitably formed in conformity with the shape of the opening 33, so the scale may be seen extending along the opening 33. More than one scale may be provided as shown in Fig. 1, if desired, and one scale is graduated in values of refractive index.

To provide easy operation of the instrument for long periods of use, the actuating mechanism for swinging the arm 21 is operated by a knob 38 which is located near the base of the housing 10 so that the knob may be operated by a hand resting on the same surface as the instrument. Operating knob 38 is mounted on a horizontal shaft 39 which is suitably journaled adjacent its ends in the opposite side walls of the housing 10 by means of bearing plates, one of which is shown at 41 in Fig. 1, suitably secured to the housing 10. An actuating screw 42, extending upwardly through chamber 12 from shaft 39, crosses the arm 21 and is rotatably journaled at its ends in bearings 43 and 44 fixed to the housing. A set of bevel gears 45 serve as a rotational connection between the shaft 39 and the actuating screw 42.

An operating connection is provided between the actuating screw 42 and arm 21 for swinging the arm by rotation of the shaft 39. The connection comprises a nut member 46 threaded on the screw 42 and said nut is held against rotation by a nut extension 47 which engages opposite sides of a stationary guide rod 48. Rod 48 is suitably fixed at its ends to the housing 10 as by the screws illustrated in Fig. 1. In the nut member 46 is a slot 49 extending substantially normal to the axis of the screw 42, and a connecting pin 51 is fixed in arm 21 in a position to protrude into the slot 49 and fit it closely so as to provide a sliding connection therewith in a direction normal to the screw.

Optical means are provided for reading the scale 37 comprising a lens 52 focused on the scale and an inclined mirror surface 53 for directing the line of sight towards the scale. Lens 52 is secured in an eyepiece 54 which is slidably held for focusing purposes in a stationary inclined tube 55 suitably anchored in a curved front wall 56 on the housing 10. Eyepiece 54 is positioned at the best elevation and inclination for the comfort of the operator. The mirror surface 53 is adjustably held in a bracket 57 extending from wall 56, and the bracket also mounts a transparent reticle disc 58 adjacent to the scale 37. A suitable fiducial mark, not shown, is formed in any desired manner upon the surface of the reticle disc 58.

To provide a constant illumination of the scale 37, a lamp 59 is mounted on the housing in such a position that light from said lamp passes through the transparent scale plate 34 and enters the eyepiece 54. Lamp 59 is held by a suitable bracket 61 attached to housing 10 and is energized through a lead 62 connected to a hold-down switch 63 which in turn is connected to a transformer 64 illustrated in Fig. 1 and a suitable source of electrical power.

The light rays emerging from the specimen holding prisms 28 and 29 form a dividing line in the field of view of the instrument when the prism box is in the position of total reflection of said rays and said line is achromatized partly by a compensating Amici prism 65 aligned on the optical axis of the instrument. Prism 65 is fixed in any preferred manner within a prism tube 66 which is rotatably mounted in an inclined bore 67 formed in the rear wall 32 of the housing. Longitudinal motion of the tube 66 is prevented by any suitable means such as a spring-pressed ball 60 located within a blind hole in the wall of bore 67, as shown in Fig. 3, and engaging in a peripheral V-groove 68 in said tube. Tube 66 is rotated by a flanged and knurled compensating ring 69 fixed on the outer diameter of the tube by means of a set screw or other preferred holding device. The ring 69 is marked on its radial face with oppositely arranged twin compensator scales 71 reading in arbitrary units from 0 to 60. Together with a stationary index pointer 72, the scales 71 indicate the angular position of said tube to the right or left of a median position during achromatization of the line of total reflectance in the field of view of the instrument.

Aligned with the prism tube 66, is a telescope body tube 73 slidably held at its inner end in the housing within the inclined bore 67 and similarly held at the other end in an outer inclined bore 74. The outer end of the telescope body 73 projects outwardly from the outer wall 56 in close proximity to the eyepiece 54 and a telescope eyepiece 75 is slidably held in said outer end. Eyepiece 54 is provided with a reticle or cross hair, not shown, located in the focal plane of the eyepiece. It will be noted that eyepieces 54 and 75 are located close to each other so that only a minimum amount of motion of the operator is necessary in making a setting of the dividing line and reading the scale.

An essential feature of this invention is the means for adjusting the maximum dispersion of the optical system of the instrument to a specified dispersive value. To provide this feature, there is provided a second Amici prism 76, called the dispersion adjusting prism, which is located on the optical axis of the instrument in operative alignment with Amici prism 65. Both of the prisms 65 and 76 contribute to the achromatization of the aforesaid boundary line and each is made with excessive dispersion for the Frauenhaufer C—F lines of the visible spectrum above the amount required by the instrument. The amount of maximum dispersion is not critical, and it may vary through wide limits, the only requirement being that it exceed a given minimum amount which is at least as low as the aforesaid specified dispersive value. Therefore, since the tolerance for each variable factor in the prism elements is relatively large, a specified dispersion may easily be provided by ordinary commercial methods. The important fact is that prism 76 is made rotatable relative to prism 65 so that by rotating prism 76 the dispersion of the instrument may be reduced from its largest possible maximum value to an exact specified maximum value for the Frauenhaufer C—F lines of the visible spectrum. Relative rotation of the adjusting prism 76 may be accomplished in any preferred manner, such as by fixing it within a sleeve 77 which is carried by and normally rotates with the prism tube 66 but it is also rotatable therein when angularly adjusting prism 76. Limited angular movement between the prisms 65 and 76 is provided by manipulating a lock screw 78 which is threaded in sleeve 77 and projects freely through an elongated peripheral slot 79 in the prism tube 66.

Light is provided for illuminating the field of view of the telescope either by natural or artificial light. A constant artificial light source is afforded by using a lamp 80 held in a suitable socket 81 in the free end of a lamp arm 82. Arm 82 is journaled on a cylindrical bearing 83 on arm 19 to rotate about said bearing so as to provide the correct incidence of light on the specimen holding prism 29. Lamp 80 is connected by a lead 84, extending into chamber 12, to the transformer 64 which is energized through a lead 85 and a switch 86 from an outside source of electrical power. A cylindrical lamp chimney 87, preferably made from a transparent material such as the commercial product "Lucite" and having a frosted outer surface to diffuse the light from the lamp 80, is suitably secured in the lamp arm 82 so as to protect the lamp. If desired, natural light is obtained by use of a mirror 88 which is adjustably held in an inclined position to direct light from the sky into the telescope. The mirror is attached to the outer surface of chimney 87 by a pair of friction attachment clips 89 and 90, secured to the mirror in any desired manner such as screws and engaging in grooves 91 and 92 formed in the outer surface of the lamp chimney 87. Thus, the mirror may be inclined into any necessary position when in use, and may be swung out of the way when not in use or it may be easily taken off the chimney 87.

Before the refractometer is ready for operation, its maximum dispersion must be adjusted to the specified amount of dispersion for the instrument to correct for the manufacturing errors in the Amici prisms 65 and 76 or other refractive errors in the optical system. This is accomplished in the following manner. A liquid test specimen having all its constants known, such as for instance, the refractive index for the D line of the visible spectrum and the dispersion characteristics, is placed between the specimen holding prisms 28 and 29 by introducing it through the filler channel 25'. The lock screw 78 is loosened and turned so as to rotate the prism 76 to that end of slot 79 where greatest dispersion is secured. White light, emanating from either the lamp 80 or cast by the mirror 88, is directed through the test specimen to the telescope by moving the arm 82 until light appears in the field of view of said telescope. Operating knob 38 is rotated to set the sector scale 37 at the aforesaid known value of refractive index of the test specimen as observed through eyepiece 54. A boundary line of total reflection consequently appears in the field of view of the telescope, and it is tentatively achromatized by rotating the prism tube 66 with the compensator ring 69 to the known setting on dials 71 for the test specimen. Subsequently, the crosshairs in the telescope are brought into registry with the boundary line. After loosening lock screw 78, the adjusting prism 76 is rotated in a direction to attenuate the dispersion of the instrument until best achromatization of the boundary line is secured and the screw 78 is then tightened to lock the parts in adjusted position. Now the refractometer is properly adjusted to offset any dispersive errors in the structure of Amici prisms 65 and 76 so that an accurate setting of the specified maximum dispersion for the C—F lines of the visible spectrum is obtained. With this adjustment made, the general operation of the instrument is the same as that of the well-known Abbe refractometer.

From the foregoing, it will be seen that there is here provided a rugged, precision refractometer having improved operating means and means for regulating the maximum dispersion of the Amici prisms used in the instrument. Effective means are also provided for protecting the internal working parts thereof from damage caused by the materials being tested or from careless handling, all these features being in accordance with the stated objects of this invention. Although but certain forms of this refractometer have been shown and described in detail, it will be understood that other forms are possible and changes may be made in the arrangement and detailed structure of the parts and substitutions may be made without departing from the spirit of the invention as defined in the claims here appended.

We claim:

1. A refractometer comprising an upright housing having an inclined wall and providing an interior chamber extending from top to bottom of the housing, an arm pivoted at one end about a lateral axis on the housing, the free end of said arm being movable in said chamber and extending toward said inclined wall, a scale on said free end, lens means held in said wall in optical alignment with said scale for reading the scale, a specimen holding prism carried by the arm near said axis, a prism tube mounted to rotate on its own axis in the housing adjacent said prism, means for rotating said tube, Amici type prism means fixed in said tube in optical alignment with the prism, a stationary telescope projecting outwardly through said inclined wall and optically aligned with the prism and Amici prism means for viewing the refracting characteristics of a specimen held on the prism, an adjustment knob rotatably mounted in the lower part of said housing, a rotatable screw member operatively connected to said knob and extending upwardly through said chamber across said arm, a nut threaded on said screw member, said nut being operatively connected to said arm whereby the arm may be moved by rotation of the knob to vary the position of the specimen holding prism.

2. In a refractometer having a housing, an arm pivoted at one end about a lateral axis on said housing, a specimen holding prism held on said arm adjacent to said axis, an accurate scale carried by the arm and having its center of curvature on said axis, lens means on the housing and optically aligned with the prism to observe the refraction of light passing through a specimen held on the prism, means for moving the arm about its axis, the combination of a first prism tube rotatable on its own axis within said housing, a second prism tube carried concentrically by the first prism tube, means for rotationally adjusting one prism tube with respect to the other, and a first and second Amici prism fixed respectively within the first and second prism tubes in optical alignment with each other and with the specimen holding prism and said lens means, the Amici prisms together having a dispersion for the Frauenhaufer C and F lines of the visible spectrum in excess of the requirements of the refractometer whereby one Amici prism may be adjusted rotationally relative to the other Amici prism to reduce the maximum dispersion for said C and F lines to a predetermined lesser value.

3. In a refractometer having movable prism means for holding a specimen and lens means in optical alignment therewith, the combination of a pair of Amici prisms mounted between the lens means and the prism means and in optical alignment therewith, said Amici prisms being mounted in a rotatable tube, one of said Amici prisms being adjustably rotatable with respect to the tube and adapted to be locked in adjusted position, the combined dispersion of the two Amici prisms for the Frauenhaufer C and F lines being greater than the dispersion required for the refractometer whereby the dispersion produced by the two Amici prisms may be adjusted for the refractometer.

JOHN W. FORREST.
RAYMOND F. E. STEGEMAN.

REFERENCES CITED

The following references are of record in the file of this patent:

FOREIGN PATENTS

| Number | Country | Date |
| --- | --- | --- |
| 178,290 | Great Britain | Apr. 20, 1922 |

OTHER REFERENCES

Bausch & Lomb Publication: Abbe and Dipping Refractometer, D-202, IV, 1932, 20 page publication, pages 10 and 11 cited. (Copy in 88-14 R.)

Gibb: Test on Optical Methods of Chemical Analysis, page 332, 1942, published by McGraw-Hill Book Co., Inc., New York, New York. (Copy in Division 7.)

Certificate of Correction

Patent No. 2,574,734 — November 13, 1951

JOHN W. FORREST ET AL.

It is hereby certified that error appears in the printed specification of the above numbered patent requiring correction as follows:

Column 6, line 69, for "accurate" read *arcuate*; column 7, line 5, before "second" insert *a*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*